United States Patent
Antoni

(10) Patent No.: US 10,208,787 B2
(45) Date of Patent: Feb. 19, 2019

(54) FUSIBLE MEMBER INTENDED TO JOIN TWO YOKES TO FORM A HINGE

(71) Applicant: MESSIER-BUGATTI-DOWTY, Velizy Villacoublay (FR)

(72) Inventor: Nicolas Antoni, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 178 days.

(21) Appl. No.: 14/654,862

(22) PCT Filed: Jan. 10, 2014

(86) PCT No.: PCT/EP2014/050385
§ 371 (c)(1),
(2) Date: Jun. 23, 2015

(87) PCT Pub. No.: WO2014/108503
PCT Pub. Date: Jul. 17, 2014

(65) Prior Publication Data
US 2015/0345545 A1    Dec. 3, 2015

(30) Foreign Application Priority Data
Jan. 10, 2013  (FR) ...................................... 13 50205

(51) Int. Cl.
*F16C 11/04* (2006.01)
*B64C 25/00* (2006.01)
(Continued)

(52) U.S. Cl.
CPC ............ *F16C 11/045* (2013.01); *B64C 25/00* (2013.01); *F16C 11/0614* (2013.01); *B64D 2045/008* (2013.01); *Y10T 403/32221* (2015.01)

(58) Field of Classification Search
CPC ........... F16C 11/00; F16C 11/02; F16C 11/04; F16C 11/045; Y10T 403/32861; Y10T 403/32606; Y10T 403/32221
See application file for complete search history.

(56) References Cited

U.S. PATENT DOCUMENTS 6,318,669 B1    11/2001  Dazet et al.
2003/0108380 A1*  6/2003  Schweitz .............. F16C 11/045
                                                    403/79
(Continued)

FOREIGN PATENT DOCUMENTS

DE    10 2009 043567 A1    4/2011
EP       1 060 986 A1     12/2000
(Continued)

OTHER PUBLICATIONS

International Search Report for PCT/EP2014/050385 dated Mar. 6, 2014.

*Primary Examiner* — Jonathan P Masinick
(74) *Attorney, Agent, or Firm* — Sughrue Mion, PLLC

(57) ABSTRACT

The invention relates to a tubular fusible member (21) extending along a longitudinal axis (AL) and for engaging in a two-lug clevis (14) and a single-lug clevis (12) in order to form a hinge (11). According to the invention, the fusible member (21) is constrained in rotation with one of the clevises (12, 14), and it presents a cross-section of shape that varies gradually between a central section and two distal sections, each distal section having reinforced thickness in its regions that extend parallel to the bending plane (PF) in which the fusible member (21) bends when it is stressed, the central section having a second moment of area relative to an axis normal to the bending plane (PF) that is greater than the second moment of area of the distal sections.

5 Claims, 3 Drawing Sheets

(51) Int. Cl.
*F16C 11/06* (2006.01)
*B64D 45/00* (2006.01)

(56) References Cited

U.S. PATENT DOCUMENTS

| | | | | |
|---|---|---|---|---|
| 2011/0081195 A1* | 4/2011 | Wang | ............... | F16G 13/06 |
| | | | | 403/154 |
| 2015/0166189 A1* | 6/2015 | Cassagne | ............ | F02C 7/20 |
| | | | | 244/54 |
| 2016/0084297 A1* | 3/2016 | Tormen | ............ | F16C 11/045 |
| | | | | 403/42 |

FOREIGN PATENT DOCUMENTS

| | | |
|---|---|---|
| GB | 2 452 938 A | 3/2009 |
| GB | 2 452 939 A | 3/2009 |

* cited by examiner

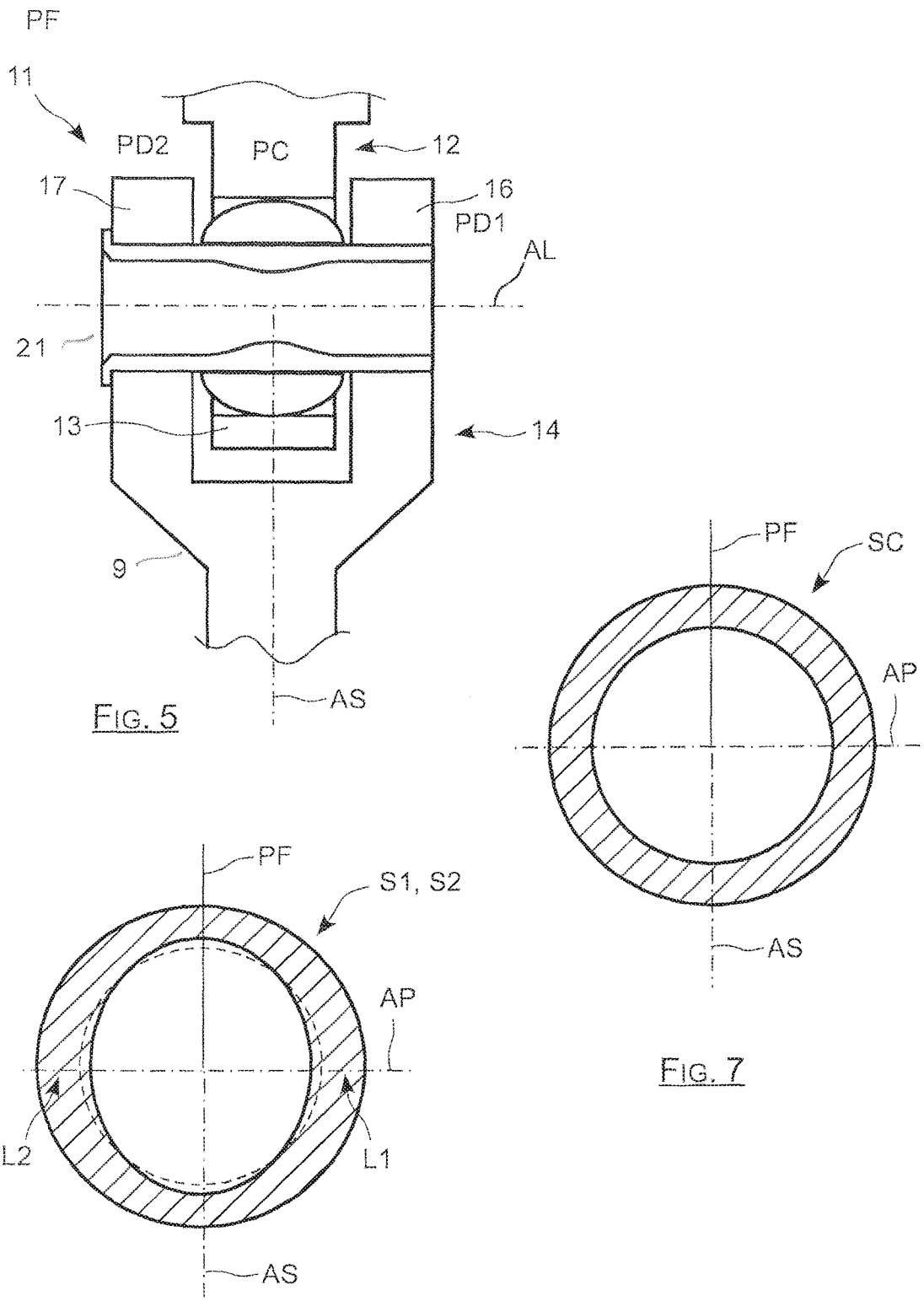

FUSIBLE MEMBER INTENDED TO JOIN TWO YOKES TO FORM A HINGE

CROSS REFERENCE TO RELATED APPLICATIONS

This application is a National Stage of International Application No. PCT/EP2014/050385 filed Jan. 10, 2014, claiming priority based on French Patent Application No. 13 50205 filed Jan. 10, 2013, the contents of all of which are incorporated herein by reference in their entirety.

The invention relates to connecting together two mechanical elements fitted respectively with a two-lug clevis and with a single-lug clevis that is secured to the two-lug clevis by a fusible member of the type comprising a tubular or solid mechanical pin.

BACKGROUND OF THE INVENTION

Such a connection is typically to be found in the components of retractable aircraft landing gear, such as the landing gear 1 shown deployed in FIG. 1. Such landing gear comprises a leg 2 having a top end 3 secured to a structural element 4 of the aircraft by means of a set of hinged top links 6. The bottom end 7 of the leg 2 carries a wheel set 8 and is secured to the structure by a side brace 9 having one end hinged to the structure 4 and its other end hinged to a bottom portion of the leg 2.

The various links and braces 6 and 9, and also other elements, are hinged to the structure 4 and to the leg 2 in an arrangement constituting a linkage for deploying and retracting the landing gear, while ensuring that the landing gear is held firmly relative to the structure of the airplane when the landing gear is deployed.

In its service position, i.e. when the landing gear is deployed, the side brace 9 lies in a plane that extends transversely relative to the longitudinal direction of the aircraft, running along an axis AS that slopes relative to the horizontal. The end of the brace 9 that is connected to the leg 2 is thus significantly lower than its opposite end that is connected to the structure 4.

The connection 11 whereby the brace 9 is connected to the bottom portion of the leg 2 is designed to be fusible: if the forces to which the brace 9 are subjected are greater than a certain threshold, which corresponds to an accidental landing situation, this connection 11 breaks. This programmed breaking of the connection 11 is to ensure that in the event of an accident, there is no risk of the brace 9 passing through the wall of the structure 4 and injuring the passengers of the aircraft.

As can seen in FIG. 2, the connection 11 comprises a single-lug clevis 12 having a single lug 13 that is rigidly secured to the bottom portion 7 of the leg 2, and a two-lug clevis 14 having two lugs 16 and 17 and that constitutes the end of the brace 9.

The single-lug clevis 12 engages between the lugs of the clevis 14, and these clevises are secured to each other by a connection member such as a tubular or solid mechanical pin that passes through the lugs so as to lie on a longitudinal axis AL in order to unite them and form a hinge.

It is this mechanical pin that constitutes the fusible member of the connection, being a tubular body of revolution of inside diameter and outside diameter that are selected so that its solid section has an area of predetermined value. This area is sufficient to guarantee that the part is strong enough for normal operation, but that it is sufficiently weak to rupture in shearing in the two gaps situated between the clevis 12 and the lugs 16 and 17 in the event of excessive force being applied to the connection 11.

The design of such a fusible member needs to satisfy two opposing constraints: the member must have sufficient mechanical strength to enable it to withstand a certain number of landings without rupturing, i.e. it must have appropriate fatigue strength, but on the contrary it must rupture in predicable manner as soon as the mechanical load applied to the connection exceeds a threshold.

Since the constraints concerning fatigue strength and rupture above a certain load threshold are difficult to reconcile, that leads to designing a fusible member with limited fatigue strength, which implies that it needs to be changed too frequently.

OBJECT OF THE INVENTION

The object of the invention is to propose a design solution that makes it possible to reconcile the fatigue strength and rupture threshold constraints for such a fusible member.

SUMMARY OF THE INVENTION

To this end, the invention provides a tubular fusible member extending along a longitudinal axis for engaging in a two-lug clevis and a single-lug clevis in order to unite them and form a hinge, while being constrained in rotation relative to one of the clevises:

the tubular fusible member having a central portion and two distal portions, the central portion being engaged in the single-lug clevis and the two distal portions each being arranged in respective lugs of the two-lug clevis when the fusible member is in place in the clevises;

the fusible member being stressed in bending when the hinge is in a service position, the member being subjected to service forces in a predetermined direction relative to the clevis to which the fusible member is constrained in rotation, this bending acting in a bending plane that contains the longitudinal axis and that extends in the predetermined direction of the service forces;

the fusible member rupturing in shear between its central portion and each distal portion when the service forces have a magnitude along an axis perpendicular to the longitudinal axis that is greater than a predetermined threshold value; and the fusible member presenting a cross-section of shape that varies gradually between a central section and two distal sections, each distal section having thickness that is reinforced in its regions extending parallel to the bending plane, the central section having a second moment of area relative to an axis normal to the bending plane that is greater than the second moment of area of the distal sections.

The invention also provides a fusible member as defined above, having an outside surface in the form of a cylinder of circular base.

The invention also provides a fusible member as defined above, wherein the distal sections have an inside outline of elliptical shape with the major axis extending parallel to the bending plane.

The invention also provides a fusible member as defined above, wherein the central section presents an inside outline that is circular.

The invention also provides a fusible member as defined above, wherein the central section presents an inside outline that is elliptical of major axis that extends perpendicularly to the bending plane.

BRIEF DESCRIPTION OF THE FIGURES

FIG. 5 is a section view of a hinge connecting a side brace to a landing gear leg and including a fusible member of the invention;

FIG. 6 is a cross-section view of a distal region of a fusible member of the invention; and FIG. 7 is a cross-section view of a central region of a fusible member of the invention.

DETAILED DESCRIPTION OF THE INVENTION

The idea on which the invention is based lies in the observation that when the prior art fusible member is correctly dimensioned with respect to its rupture force threshold, and when it is mounted so as to be prevented from rotating, then premature rupture in fatigue gives rise to one or more rupture starters that always appear in the same regions of the fusible member.

Figure 1:
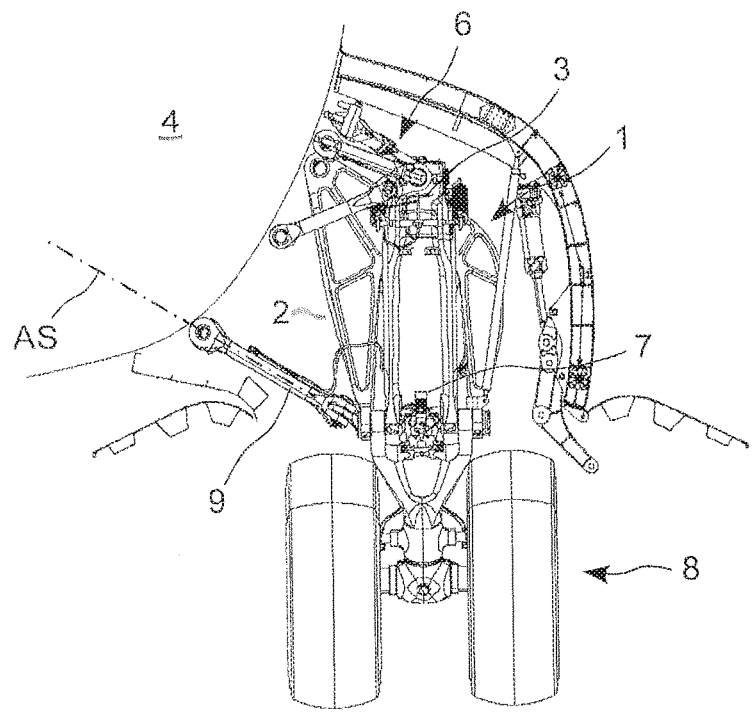
FIG. 1 is a face view of deployed aircraft landing gear including a hinged side brace.
Figure 2:
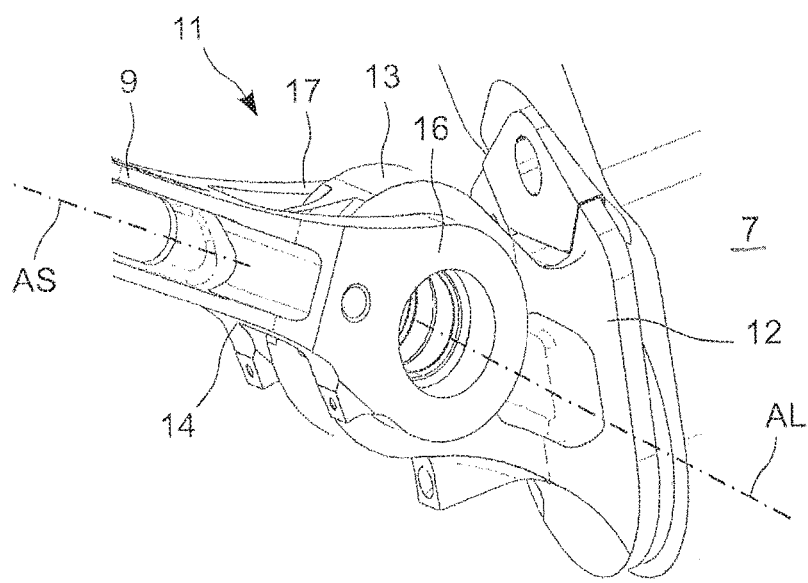
FIG. 2 is a detail view in perspective showing a hinge connecting a side brace to a landing gear leg.
Figure 3:
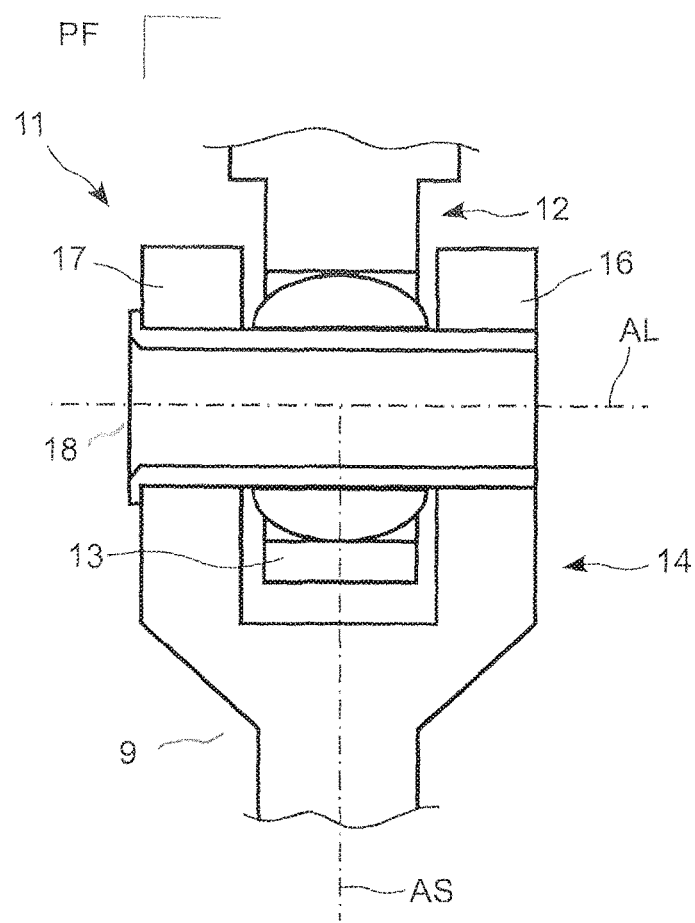
FIG. 3 is a section view of a hinge connecting a side brace to a landing gear leg and including a prior art fusible member.
Figure 4:
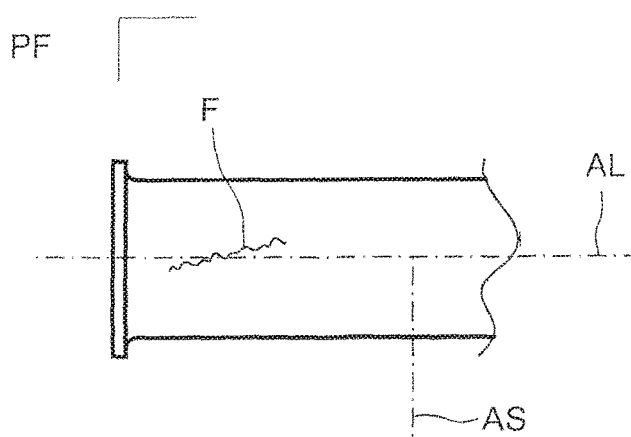
FIG. 4 is a side view of the results of a test performed on the prior art fusible member when mounted so as to be prevented from rotating relative to one of the clevises and in which a fatigue rupture starter has appeared.

As shown in FIG. 3, which is a cross-section view of the connection 11 of FIGS. 1 and 2, the forces to which the fusible member 18 are subjected on each landing are always directed in the same manner, such that the fusible member 18 is stressed in the same manner on each occasion.

The fusible member 18 is subjected to the operating force that is directed parallel to the axis AS and comprises two components that are applied respectively to the lugs 16 and 17 of the clevis 14, and the reaction from the single lug 13 of the clevis 12. In other words, all of the forces to which the fusible member are subjected are directed mainly parallel to the axis AS, being applied at different positions along the longitudinal axis AL.

As a result, the fusible member 18 is always subjected to the same kind of loading on landing, thereby stressing it in bending in a plane referenced PF that contains the axis AS of the brace and the longitudinal axis AL of the fusible member 18. By performing tests, it has been found that when the fusible member 18, in this example a simple tubular pin of circular section, is prevented from rotating about its longitudinal axis, e.g. being prevented from rotating relative to the clevis 12 or 14, then the rupture starters always appear in the same regions along the axis.

Each rupture starter is in the form of a crack F extending obliquely relative to the longitudinal axis AL and relative to the force application axis AS, this crack forming in the inner and/or the outer surface of the member 18. This shape corresponds to a rupture starter for shear in bending and results from repeated stressing of the axis AX in bending in the plane PF.

Since the member 18 is prevented from moving in rotation, it is subjected to bending always in the same bending plane, written PF, which is the plane containing the longitudinal axis AL and the force application axis AS.

In practice, each crack F appears in an end portion of the member 18, i.e. one and/or the other of the regions of the member 18 engaged in a lug 16 or 17 of the clevis 14. Furthermore, these cracks F always appear in the same locations around the longitudinal axis AL: they appear in the regions of the inside and/or outside face of the member that extend parallel to the bending plane PF.

Bending shear cracks thus appear as a result of fatigue cycles and they appear in four regions of the fusible member that are situated along the member 18 substantially level with the lugs of the two-lug clevis and situated around its longitudinal axis in zones that extend parallel to the bending plane PF.

In the invention, the predefined fatigue strength and rupture constraints are reconciled by providing a fusible member of section that varies all along its longitudinal axis so as to present greater thicknesses in the regions where rupture starters appear, which are close to the ends of the fusible member, and an increased axial second moment of area in its central portion.

The extra thicknesses are thus situated in regions where bending shear rupture starters might appear so as to avoid these starters appearing. In the other regions having the same cross-section, the thickness is thus smaller, thus making it possible to conserve a sectional area that is appropriate for complying with the predetermined rupture criterion.

In order to compensate for the reduction in the second moment of area (or "inertia") about an axis normal to the bending plane, which makes the fusible member weaker in bending, the section of its central portion is on the contrary provided with a shape that gives it a second moment of area about an axis normal to the bending plane that is greater than in the other sections.

The term "second moment of area" is used herein to mean the second moment of area that determines the bending strength in the bending plane in which the fusible member bends when it is stressed, i.e. the axial second moment of area about an axis normal to the bending plane, and not the polar second moment of area.

As shown in FIGS. 5 to 7, the fusible member of the invention, which is given reference 21, is located in a ball joint clevis, however the invention does not in any way require a clevis of the ball joint type. As can be seen in these figures, the fusible member of the invention presents a section that varies in three portions, namely a central portion PC that coincides with the portion engaged in the single lug 13 of the clevis 12, and two distal portions PD1 and PD2 that coincide with the portions that are engaged respectively in the lugs 16 and 17 of the clevis 14.

In the example of FIGS. 5 to 7, the fusible member is a generally tubular part having an outside surface in the form of a cylinder of circular base with an outwardly-directed end flange to form a stopper, and it is the shape of the inside outline of its section that varies along the longitudinal axis AL.

In the distal portions PD1, PD2, the fusible member presents respective cross-sections S1 and S2 of the same shape as shown in FIG. 6. These sections thus have an outer outline that is circular, but an inner outline that is elliptical and is oriented in such a manner that the major axis of the ellipse that it forms lies in the bending plane PF.

This elliptical inside shape oriented in this way thus serves to constitute lateral extra thicknesses L1 and L2 in the regions of the sections S1 and S2 that extend parallel to the bending plane PF, so as to reduce the possibility of bending shear rupture starters forming in these regions.

Furthermore, this elliptical shape provides thinning in two opposite regions, namely the regions that intersect the bending plane PF. This thinning serves to ensure that the sections S1 and S2 retain a total area that is sufficiently small and that corresponds to a predetermined value that is required to rupture in the event of forces in operation that exceed a threshold value.

In its central portion PC, the fusible member 21 presents a cross-section SC that is different from the sections S1 and S2, and in this example is a simple circular section of constant thickness: the inside outline of the section SC is circular.

This shape for the central section presents the advantage of having a second moment of area about an axis AC normal to the bending plane that is greater than the second moment of area of the sections S1 and S2 about corresponding axes normal to the plane PF. The central section may advantageously have an area that corresponds to the area of the sections S1 and S2.

In other words, the shape of the sections S1 and S2 presents the advantage of forming extra thicknesses in those regions where rupture starters appear, but it leads to thinning in the opposite regions, thereby penalizing the second moment of area by reducing it. As a result these sections S1 and S2 nevertheless tend to weaken the member 21 in terms of bending strength in a plane PF.

This reduction in the second moment of area in the distal portions PD1 and PD2 is compensated by an increase in the second moment of area in the sections of the central portion RC. The fusible member 21 of the invention thus presents bending strength that remains compatible with that which would be provided by a prior art tubular member of constant section.

Furthermore, as can be seen in FIGS. 5 to 7, the inside outline of the section of the hollow fusible member 21 varies gradually along its longitudinal axis AL so as to avoid presenting any corner or irregularity that might facilitate the appearance of unexpected rupture starters.

By way of example, such an inside shape may be obtained by numerically controlled machining in a plurality of passes prior to one or more polishing operations of the resulting inside surface.

In general manner, the invention applies to circumstances where fusible pins are of small thickness, i.e. to fusible pins in which the ratio of diameter over thickness is greater than six.

As mentioned above, the fusible member of the invention is designed to be prevented from moving in rotation relative to one of the clevises that it connects together. This constraint in rotation may be provided by means of a stud or the like engaging in a radial hole formed in the single lug of the single-lug clevis, this stud thus engaging in a corresponding radial hole formed in the fusible member.

Other solutions may be envisaged for preventing the member from rotating, such as for example a stud extending longitudinally and being engaged through an outside face of one of its lugs of the two-lug clevis, and a corresponding hole formed in a flared end of the fusible member. Under such circumstances, on assembly, the longitudinal stud engages in the hole in the flare in order to prevent it from moving in rotation relative to the two-lug clevis.

The invention claimed is:

1. A tubular fusible member extending along a longitudinal axis, the tubular fusible member comprising:
   a central portion, and
   two distal portions,
   wherein the fusible member presents a cross-section of shape that varies gradually between a central cross-section and two distal cross-sections, and has in each distal cross-section a thickness that is reinforced in regions of said distal cross-section extending parallel to a bending plane that contains the longitudinal axis, the central cross-section having a second moment of area relative to an axis normal to the bending plane that is greater than the second moment of area of the distal cross-sections,
   wherein the distal cross-sections (SD1, SD2) have an inside outline of elliptical shape with the major axis extending parallel to the bending plane (PF), and
   wherein the elliptical shape is an oval defined by two foci and both foci are at different points.

2. A fusible member according to claim 1, having an outside surface in the form of a cylinder of circular base.

3. A fusible member according to claim 1, wherein the central cross-section (SC) presents an inside outline that is circular.

4. A fusible member according to claim 1, wherein the central cross-section (SC) presents an inside outline that is elliptical of major axis that extends perpendicularly to the bending plane (PF).

5. A hinge comprising:
   a two-lug clevis (14),
   a single-lug clevis (12), and
   a fusible member (21) according to claim 1:
   wherein the central portion (PC) of the fusible member being engaged in the single-lug clevis (12) and the two distal portions (PD1, PD2) each being arranged in respective lugs (16, 17) of the two-lug clevis (14), the fusible member (21) being constrained in rotation relative to one of the devises (12, 14),
   wherein the fusible member (21) is stressed in bending when the hinge (11) is in a service position, the member being subjected to service forces in a predetermined direction (AS) relative to the clevis to which the fusible member is constrained in rotation, said bending acting in a bending plane (PF) that extends in the predetermined direction (AS) of the service forces, and
   wherein the fusible member (21) ruptures in shear between its central portion (PC) and each distal portion (PD1, PD2) when the service forces have a magnitude along an axis perpendicular to the longitudinal axis (AL) that is greater than a predetermined threshold value,
   wherein the fusible member's distal cross-sections (SD1, SD2) have an inside outline of an oval elliptical shape with the major axis extending parallel to the bending plane (PF), and
   wherein the oval elliptical shape is defined by two foci located at different points.

* * * * *